United States Patent
Wakeland et al.

(10) Patent No.: US 10,555,071 B2
(45) Date of Patent: Feb. 4, 2020

(54) EYEGLASS HEADPHONES

(71) Applicant: Bose Corporation, Framingham, MA (US)

(72) Inventors: Ray Scott Wakeland, Marlborough, MA (US); Ryan C. Struzik, Hopkinton, MA (US); Chester S. Williams, Lexington, MA (US); Jason D. Silver, Framingham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/884,924

(22) Filed: Jan. 31, 2018

(65) Prior Publication Data
US 2019/0238971 A1 Aug. 1, 2019

(51) Int. Cl.
| | | |
|---|---|---|
| H04R 1/10 | (2006.01) | |
| H04R 1/24 | (2006.01) | |
| G02C 11/00 | (2006.01) | |
| H04R 1/34 | (2006.01) | |
| H04R 1/02 | (2006.01) | |
| H04R 5/02 | (2006.01) | |

(52) U.S. Cl.
CPC .............. *H04R 1/24* (2013.01); *G02C 11/10* (2013.01); *H04R 1/1008* (2013.01); *H04R 1/347* (2013.01); *H04R 1/028* (2013.01); *H04R 5/02* (2013.01); *H04R 2205/022* (2013.01)

(58) Field of Classification Search
CPC .. H04R 1/24; H04R 1/1008; H04R 2205/022; G02C 11/10
USPC .......................................................... 381/327
See application file for complete search history.

(56) References Cited

U.S. PATENT DOCUMENTS

| | | | |
|---|---|---|---|
| 4,856,086 A | 8/1989 | McCullough | |
| 5,272,757 A | 12/1993 | Scofield et al. | |
| 6,301,367 B1* | 10/2001 | Boyden | A42B 1/245 2/209 |

(Continued)

FOREIGN PATENT DOCUMENTS

| | | |
|---|---|---|
| DE | 102007028652 A1 | 1/2009 |
| DE | 102016103477 A1 | 8/2017 |

OTHER PUBLICATIONS

Unpublished U.S. Appl. No. 15/375,119, filed Dec. 11, 2016; Applicant: Bose Corporation.

(Continued)

*Primary Examiner* — Sean H Nguyen
(74) *Attorney, Agent, or Firm* — Brian M. Dingman; Dingman IP Law, PC

(57) ABSTRACT

An eyeglass headphone with a frame that is constructed and arranged to be carried by the head of a wearer, the frame comprising a bridge that is adapted to be supported by the wearer's nose, and a left temple and a right temple that extend rearwardly from the bridge, toward the left and right ears of the wearer, respectively, and a dipole loudspeaker built into the frame, where the dipole loudspeaker comprises a driver that emits front-side acoustic radiation from its front side, and emits rear-side acoustic radiation from its rear side. The frame comprises at least first and second sound-emitting openings, wherein the first sound-emitting opening is constructed and arranged to emit front-side acoustic radiation and the second sound-emitting opening is constructed and arranged to emit rear-side acoustic radiation.

18 Claims, 11 Drawing Sheets

(56) References Cited

U.S. PATENT DOCUMENTS

| | | | |
|---|---|---|---|
| 6,729,726 B2* | 5/2004 | Miller | H04M 1/05 351/123 |
| 7,147,324 B2 | 12/2006 | Jannard et al. | |
| 7,744,213 B2 | 6/2010 | Jannard et al. | |
| 9,794,676 B2 | 10/2017 | Shetye et al. | |
| 2005/0128431 A1* | 6/2005 | Jannard | G02C 11/06 351/158 |
| 2008/0008344 A1* | 1/2008 | Wakabayashi | G02C 11/06 381/327 |
| 2013/0022220 A1* | 1/2013 | Dong | H04R 5/023 381/151 |
| 2013/0051585 A1* | 2/2013 | Karkkainen | H04R 1/1075 381/151 |
| 2013/0250233 A1* | 9/2013 | Blum | G02C 11/10 351/158 |
| 2015/0382100 A1 | 12/2015 | Azmi et al. | |

OTHER PUBLICATIONS

Unpublished U.S. Appl. No. 15/647,749, filed Jul. 12, 2107; Applicant: Bose Corporation.
The International Search Report and the Written Opinion of the International Searching Authority for PCT Application No. PCT/US2019/015784 dated May 9, 2019.

* cited by examiner

EYEGLASS HEADPHONES

BACKGROUND

This disclosure relates to headphones built into eyeglasses.

Off-ear headphones produce sound using an acoustic driver that is spaced from the ear. Such headphones should ideally deliver high-quality sound to the ears at desired volumes, without spilling too much sound to the environment.

SUMMARY

All examples and features mentioned below can be combined in any technically possible way.

In one aspect, an eyeglass headphone includes a frame that is constructed and arranged to be carried by the head of a wearer, the frame comprising a bridge that is adapted to be supported by the wearer's nose, and a left temple and a right temple that extend rearwardly from the bridge, toward the left and right ears of the wearer, respectively, and a dipole loudspeaker built into the frame, where the dipole loudspeaker comprises a driver that emits front-side acoustic radiation from its front side, and emits rear-side acoustic radiation from its rear side. The frame comprises at least first and second sound-emitting openings, wherein the first sound-emitting opening is constructed and arranged to emit front-side acoustic radiation from the frame, and the second sound-emitting opening is constructed and arranged to emit rear-side acoustic radiation from the frame.

Embodiments may include one of the following features, or any combination thereof. The frame may further comprise a third sound-emitting opening that is constructed and arranged to emit rear-side acoustic radiation from the frame. The distance between openings may define an effective length of the dipole loudspeaker. The effective length may be frequency dependent. The effective dipole length may be larger at lower frequencies than it is at higher frequencies. The loudspeaker may comprise a port that leads to one of the second and third sound-emitting openings, wherein an acoustic impedance of the port rises with frequency, so that the effective dipole length is larger at lower frequencies than it is at higher frequencies Embodiments may include one of the above and/or below features, or any combination thereof. The frame may further comprise a first acoustic cavity that receives the front-side acoustic radiation. The first sound-emitting opening may be acoustically coupled to the first acoustic cavity, to emit from the frame radiation from the first acoustic cavity. The frame may further comprise a third sound-emitting opening that is constructed and arranged to emit from the frame radiation from the first acoustic cavity. The third sound-emitting opening and the first sound-emitting opening may each have an acoustic impedance, and the two acoustic impedances may be different from each other. The frame may further comprise a second acoustic cavity that receives the rear-side acoustic radiation. The second sound-emitting opening may be acoustically coupled to the second acoustic cavity, to emit from the frame radiation from the second acoustic cavity.

Embodiments may include one of the above and/or below features, or any combination thereof. The eyeglass headphones may further comprise electronic circuitry coupled to the frame and that is arranged to wirelessly transmit or receive audio signals that are played by the dipole loudspeaker. The electronic circuitry may comprise an antenna built into a temple. The electronic circuitry may comprise separate electronics in each temple, and two antennas, one antenna built into each of the temples and electrically coupled to the electronics in that temple. The antennas may be in the temples proximate the bridge.

Embodiments may include one of the above and/or below features, or any combination thereof. The eyeglass headphones may further comprise a microphone carried by a temple and arranged to directly face the head. The one of the first and second sound-emitting openings may be located in front of an ear of the wearer. The other of the first and second sound-emitting openings may also be located in front of the ear of the wearer, and may be farther from the ear canal opening than is the one of the first and second sound-emitting openings. The one of the first and second sound-emitting openings may be located a first distance from and along a first axis from the opening of the ear canal, and the first and second sound-emitting openings may be located a second distance from one another along a second axis that intersects the first axis. The first and second axes may not be coincidental, and an angle between the first axis and the second axis may be no more than about 90 degrees. The first distance may be no more than about 35 mm.

In another aspect, an eyeglass headphone includes a frame that is constructed and arranged to be carried by the head of a wearer, the frame comprising a bridge that is adapted to be supported by the wearer's nose, and a left temple and a right temple that extend rearwardly from the bridge, toward the left and right ears of the wearer, respectively. Dipole loudspeakers are built into each of the temples. The dipole loudspeakers comprise a driver that emits front-side acoustic radiation from its front side, and emits rear-side acoustic radiation from its rear side. The temple comprises at least first, second, and third sound-emitting openings, wherein the first sound-emitting opening is located in front of an ear of the wearer and is constructed and arranged to emit front-side acoustic radiation from the temple, and wherein the second sound-emitting opening is also located in front of the ear of the wearer and is farther from the ear canal opening than is the first sound-emitting opening, and wherein the second and third sound-emitting openings are constructed and arranged to emit rear-side acoustic radiation from the temple, wherein a distance between openings defines an effective length of the dipole loudspeaker, and wherein the effective length is frequency dependent where the effective dipole length is larger at lower frequencies than it is at higher frequencies.

DETAILED DESCRIPTION

Figure 1:
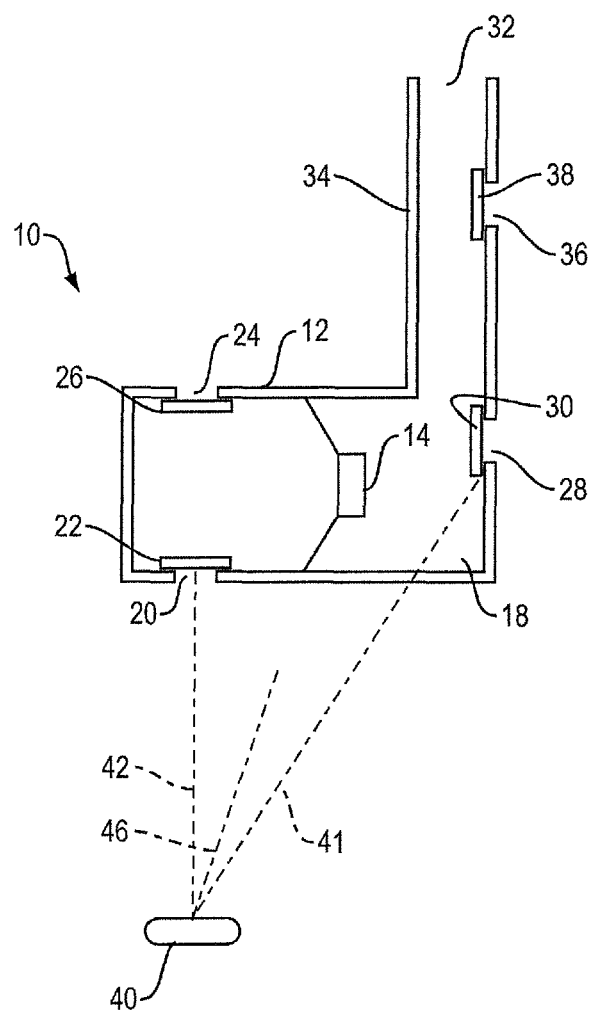
FIG. 1 is schematic cross-sectional view of a dipole loudspeaker for eyeglass headphones.

Off-ear headphones produce sound using an acoustic driver that is spaced from the ear. Such headphones should ideally deliver high-quality sound to the ears at desired volumes, without spilling too much sound to the environment. Eyeglass headphones can be accomplished with one or more dipole loudspeakers built into the eyeglass frame. Dipole loudspeakers produce out of phase sound from opposite sides of the loudspeaker's acoustic driver. The sound can be emitted from openings or vents in the eyeglass frame. If one vent is close to an ear and the other vent is farther from the ear, quality sound can be delivered to the ear with minimal spillage. Examples of off-ear headphones with dipole loudspeakers are disclosed in U.S. Pat. No. 9,794,676 and U.S. patent application Ser. No. 15/375,119, filed on Dec. 11, 2016; the disclosures of this patent and this patent application are incorporated herein by reference in their entireties.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

A dipole loudspeaker for the eyeglass headphones includes an acoustic driver or radiator that emits front-side acoustic radiation from its front side, and emits rear-side acoustic radiation to its rear side. The dipole loudspeaker is built into the frame of the eyeglasses. A housing directs the front-side acoustic radiation and a housing directs the rear-side acoustic radiation. A plurality of sound-conducting vents (openings) in the housing allow sound to leave the housing. Openings in the eyeglass frame can be aligned with these vents, so that the sound also leaves the frame. A distance between the sound-conducting openings defines an effective length of an acoustic dipole of the loudspeaker. The effective length may be considered to be the distance between the two openings that contribute most to the emitted radiation at any particular frequency. The housing and its openings can be constructed and arranged such that the effective dipole length is frequency dependent. The loudspeaker dipole transducer is able to achieve a greater ratio of sound pressure delivered to the ear to spilled sound, as compared to an off-ear headphone not having this feature.

A headphone refers to a device that typically fits around, on, or in an ear and that radiates acoustic energy into the ear canal. This disclosure describes a type of headphone that sits near, but does not block the ear, referred to as an off-ear headphone. Headphones are sometimes referred to as earphones, earpieces, headsets, earbuds, or sport headphones, and can be wired or wireless. A headphone includes an acoustic transducer driver to transduce audio signals to acoustic energy. While some of the figures and descriptions following show a single loudspeaker, a headphone may be a single stand-alone unit or one of a pair of headphones (each including at least one acoustic driver), one arranged to provide sound to each ear. A headphone may be connected mechanically to another headphone, for example by the eyeglass frame or by another structure, and/or by leads that conduct audio signals to an acoustic driver in the headphone. A headphone may include components for wirelessly receiving audio signals. A headphone may include components of an active noise reduction (ANR) system. Headphones may also include other functionality, such as a microphone.

Exemplary dipole loudspeaker 10 for the present eyeglass headphones is depicted in FIG. 1, which is a schematic longitudinal cross-section. Loudspeaker 10 includes acoustic radiator 14 that is located within housing 12. Housing 12 is closed, or essentially closed, except for a number of sound-emitting openings. The housing and its openings are constructed and arranged to achieve a desired sound pressure level (SPL) delivery to a particular location, while minimizing sound that is spilled to the environment. These results make loudspeaker 10 an effective off-ear headphone.

Housing 12 defines an acoustic radiator front volume or cavity 16, and an acoustic radiator rear volume or cavity 18. Acoustic radiator 14 radiates sound pressure into both volume 16 and volume 18, the sound radiated into the two different volumes being out of phase. Housing 12 thus directs both the front side acoustic radiation and the rear side acoustic radiation. Housing 12 comprises four or more openings in this non-limiting example. Front side opening or vent 20 is optionally covered by a screen 22 to help keep out debris and moisture. Screen 22 can in one non-limiting example be a 6 mks Rayl screen. Rear side opening or vent 28 is covered by a screen 30 to help keep out debris and moisture, such as a 46 mks Rayl polymer screen made by Saati Americas Corp., with a location in Fountain Inn, SC, USA. Rear port opening 32 is located at the distal end of port (i.e., acoustic transmission line) 34, and may also be covered by a screen (not shown) to help keep out debris and moisture. An acoustic transmission line is a duct that is adapted to transmit sound pressure, such as a port or an acoustic waveguide. A port and a waveguide typically have acoustic mass. Second rear opening 36 covered by a resistive screen 38 is an optional element that can be included to damp standing waves in port 34, as is known in the art. Without screened opening 36, at the frequency where the port length equals half the wavelength, the impedance to drive the port is very low, which would cause air to escape through the port rather than screened opening 28. When screened opening 36 is included the distances along port 34 may be broken down into a first distance from the entrance of port 34 to opening 36, and a second distance from opening 36 to opening 32. In a general sense, sound travels along axis 42 from vent 20 to ear canal opening 40, along axis 41 from vent 28 to ear canal opening 40, and along axis 46 from port opening 32 to ear canal opening 40. Note that any acoustic opening has a complex impedance, with a resistive (energy dissipating) component and a reactive (non-dissipating) component. When an opening is referred to as resistive, it means that the resistive component is dominant.

A front opening and a rear opening radiate sound to the environment outside of housing 12 in a manner that can be equated to an acoustic dipole. Note that since the driver emits sound from both of its faces, the terms "front" and "rear" are used for convenience only, and the arrangement shown in some of the drawings could be reversed. In other words, either side can be arranged to radiate into either of the front and rear cavities. One dipole would be accomplished by vent 20 and vent 28. A second, longer, dipole would be accomplished by vent 20 and port opening 32. An ideal acoustic dipole exhibits a polar response that consists of two lobes, with equal radiation forwards and backwards along a radiation axis, and no radiation perpendicular to the axis. Loudspeaker 10 as a whole exhibits acoustic characteristics of an approximate dipole, where the effective dipole length or moment is not fixed, i.e., it is variable. The effective length of the dipole can be considered to be the distance between the two sound-emitting openings that contribute the most to acoustic radiation at any particular frequency. In the present example, the variability of the dipole length is frequency dependent. Thus, housing 12 and openings 20, 28 and 32 are constructed and arranged such that the effective dipole length of loudspeaker 10 is frequency dependent. Frequency dependence of a variable-length dipole and its effects on the acoustic performance of a loudspeaker are further described below. The variability of the dipole length has to do with which vents dominate at what frequencies. At low frequencies opening 32 dominates over opening 28, and so the dipole length is long. At high frequencies, opening 28 dominates (in volume velocity) over opening 32, and so the dipole spacing is short.

One or more openings on the front side of the transducer and one or more openings on the rear side of the transducer create dipole radiation from the loudspeaker. When used in an open personal near-field audio system (such as with the present off-ear eyeglass headphones), there are acoustic challenges that are addressed by the variable-length dipole loudspeakers. Headphones should deliver sufficient SPL to the ear, while at the same time minimizing spillage to the environment. The variable length dipole of the present loudspeaker allows the loudspeaker to have a relatively large effective dipole length at low frequencies and a smaller effective dipole length at higher frequencies, with the effective length relatively smoothly transitioning between the two frequencies. In the present instance, where the sound source is placed near but not covering an ear, what is desired is high SPL at the ear and low SPL spilled to bystanders (i.e., low SPL farther from the source). The SPL at the ear is a function of how close the front and back side openings of the dipole are to the ear canal. Having one dipole source close to the ear and the other far away causes higher SPL at the ear for a given driver volume displacement. This allows a smaller driver to be used. However, spilled SPL is a function of dipole length, where larger length leads to more spilled sound. For a headphone, in which the driver needs to be relatively small, at low frequencies driver displacement is a limiting factor of SPL delivered to the ear. This leads to the conclusion that larger dipole lengths are better at lower frequencies, where spillage is less of a problem because humans are less sensitive to bass frequencies as compared to mid-range frequencies. At higher frequencies, the dipole length should be smaller.

In off-ear headphones with a single sound-emitting outlet pointed generally at the ear, standing waves in the acoustic cavity can cause intermodulation distortion or IMD, particularly at higher sound pressure levels (SPLs). IMD can be reduced by using two sound-emitting outlets in the housing. The SPL from one outlet is directed toward the ear, while the SPL from the other outlet is directed away from the ear. Having two opposed outlets in the same acoustic cavity shifts the fundamental front cavity 16 resonance upward, and thus leads to reduced IMD. IMD reduction in an acoustic cavity is disclosed in U.S. patent application Ser. No. 15/647,749, filed on Jul. 12, 2017, the entire disclosure of which is incorporated herein by reference.

In some non-limiting examples, one sound-emitting outlet is designed to have greater equivalent acoustic impedance than the other. When a first outlet emits SPL directed toward the ear, and the second outlet is opposed to the first outlet, the second outlet may have a greater equivalent acoustic impedance than the first outlet. A result is the flow through the second outlet is minimal except around the fundamental frequency. This can allow for higher SPL with lower IMD at the ear, as well as less spilled sound. Note that the loudspeaker could have more than two sound-emitting outlets in front cavity 16.

Front acoustic cavity 16 in this example includes two sound emitting outlets or vents 20 and 24. In one non-limiting example, vents 20 and 24 are directly opposed such that they emit sound in approximately opposite directions. This is one non-limiting example of an arrangement of two vents in the front acoustic cavity. In one non-limiting example, outlets 20 and 24 are the same size, and the acoustic impedance of outlet 24 is increased above that of outlet 20 by adding a resistive screen 26 over opening 24. Outlet 24 can be configured to have a greater acoustic impedance than outlet 20 in other ways as well, such as by making outlet 24 smaller than outlet 20.

The second sound-emitting outlet 24 can be designed to present either an inertance or a resistance. Generally, it is expected that a resistance will be a more effective implementation than an inertance. There are a several effects to consider in this regard. For one, it is expected that damping the cavity resonance is likely to reduce IMD because modulation of a damped resonance is less objectionable than modulation of a sharp resonance. A resistance will help damp the cavity resonance, and an inertance will not (except in the respect that it will have some radiation damping). Also, it is expected that shifting the fundamental cavity resonance frequency upward will reduce an IMD interaction with the transducer; both a resistance and inertance can shift the cavity resonance frequency. Further, it is generally desirable to direct sound out of the first sound-emitting outlet 20 toward the ear, especially at low frequencies, but adding one or more additional sound-emitting outlets necessarily diverts/reduces the output from the first outlet. There is a balance between reducing IMD and leaving sufficient output for the desired purpose of the loudspeaker—delivering sound to the ear. With a resistance in the second outlet, the output from the second outlet will have first-order roll-off at low frequencies with respect to the first outlet. With an inertance in the second outlet, the output from the second outlet will be some constant ratio of the first outlet output at low frequencies, like a current divider. The roll-off associated with the resistance is generally preferred.

Accordingly, designing the second outlet to exhibit an inertance can likely provide some IMD improvement, but only insomuch as the shifting of the cavity resonance frequency occurs and that frequency is problematic for the loudspeaker. When the second outlet has a resistance the damping of the cavity resonance is likely to help reduce IMD irrespective of the specific transducer.

Adding the second outlet is effective to decrease IMD. However, each outlet contributes to sound emission from the loudspeaker. In the case where the outlets have the same areas, sound is emitted equally from both outlets. Since one outlet is pointed away from the ear, the second outlet reduces the SPL directed toward the ear. This arrangement also leads to more sound spillage, which is generally undesirable. Higher SPL at the ear and less spillage can be accomplished if the outlet pointed away from the ear (e.g., outlet 24) is arranged to have a higher equivalent acoustic impedance than the outlet pointed toward the ear (e.g., outlet 20). The disparate equivalent acoustic impedances of the two outlets can be accomplished in any convenient manner. One manner is to cover opening 24 with a resistive screen that increases the equivalent acoustic impedance of the covered opening. This is shown in FIG. 1, where screen 26 covers opening 24, while opening 20 is left un-screened, or perhaps screened with a screen 22 with much lower acoustic impedance. In one non-limiting example, screen 26 is a 1000 mks rayl polymer screen made by Saati Americas Corp., with a location in Fountain Inn, SC, USA. Opening 20 can be left completely open, or can be covered by a 6 mks rayl screen, also available from Saati Americas, that provides some water and dust resistance while not substantially altering the acoustic impedance of the opening. Another manner to achieve different equivalent acoustic impedances would be to create openings with different areas, since impedance is related to area.

Figure 2:
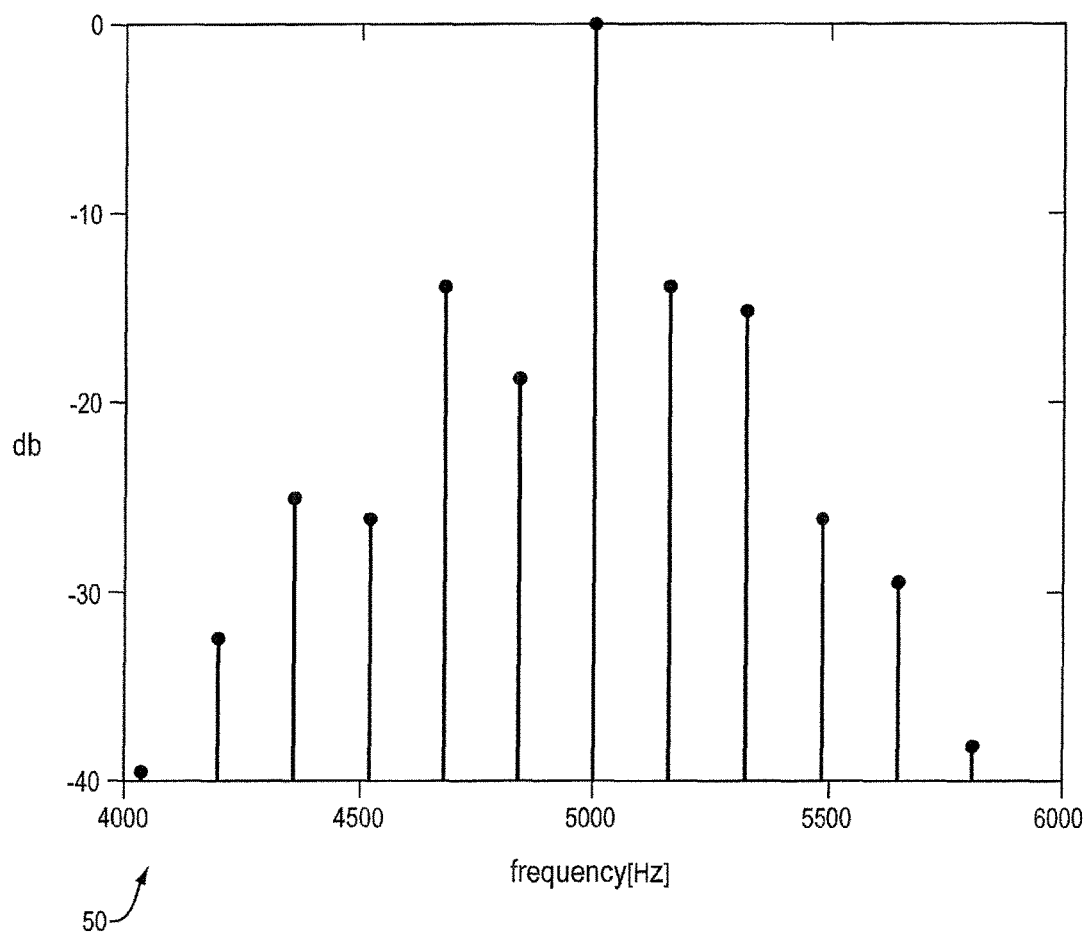
FIG. 2 is an exemplary plot illustrating an intermodulation spectrum of a dipole loudspeaker of the eyeglass headphones.

FIG. 2 illustrates front-cavity IMD when the second outlet has a higher effective acoustic impedance than the first outlet. In the present dipole loudspeaker, the front acoustic cavity can be designed to mitigate a modulation distortion that is believed to arise because of an acoustic resonance across the width of the acoustic cavity into which the driver radiates. In FIG. 2, the loudspeaker is presumed to have an acoustic resonance of around 5 kHz. When a 5 kHz tone is played in the presence of lower frequency tones that cause large transducer displacement amplitudes, IMD results. In the test for which results are presented in FIG. 2, the test signal used to develop the data was the sum of two tones—the problematic 5 kHz tone and a typical low frequency of 160 Hz. The 160 Hz input had an amplitude 20 dB higher than the 5 kHz input. In an ideal linear system, the output pressure at the mouth of a single opening in the acoustic cavity would also consist of only these two frequencies. However, the nonlinearities of the acoustic cavity cause the appearance of distortion tones clustered around the 5 kHz output tone at intervals of 160 Hz. In FIG. 2 the amplitude of the 5 kHz output is taken to be 0 dB.

In a loudspeaker with only a single front cavity outlet (e.g., outlet 20, which would typically be pointed at the ear) rather than two opposed outlets as shown in FIG. 1, there would be a high level of the distortion products at the distortion frequencies above and below 5 kHz, which may be unacceptable with music content. The acoustic resonance at 5 kHz occurs at least in part because of the geometry of the acoustic cavity—its particular size and shape. With one outlet opening, the cavity acts something like a quarter-wave resonance, with a pressure amplitude minimum (nearly zero) at the opening, and a maximum at the opposite wall.

When a second opening is created on the opposite side of the cavity (e.g., outlet 24), this second opening essentially eliminates the 5 kHz resonance. Distortion is reduced. Half of the sound exits the second opening, which reduces low-frequency pressure at the ear, potentially by up to nearly 6 dB. It is believed that any remaining distortion would be due to system nonlinearities, especially motor force and suspension stiffness variations with axial voice coil position.

Adding a second outlet in the wall opposite the first opening causes there to be a pressure minimum at both openings. With two opposed pressure minima, the resonance occurs at roughly twice the 5 kHz frequency of the original resonance. This higher frequency resonance leads to some distortion at the higher frequency, but this may not be an operational problem because the IMD at the higher frequency is likely minimal.

In the plot 50 of FIG. 2, the second opening 24 is covered with 1000 mks rayl acoustic mesh 26, which increases both output at the primary opening 20 and also slightly increases distortion. The value of 1000 mks rayl in this case gives a distortion level of around −14 dB at most. Depending on the value of the screen resistance of the second opening, the opening looks more or less like a closed or open wall. But the screen also adds loss, which damps all resonances. The 1000 mks rayl screen used to create the measurements of FIG. 2 is a large value, most of the way to being effectively "closed." If a lower-resistance screen was used, there would be less loss, making that opening look more "open," but more of the SPL would leak out through this second opening.

Figure 3:
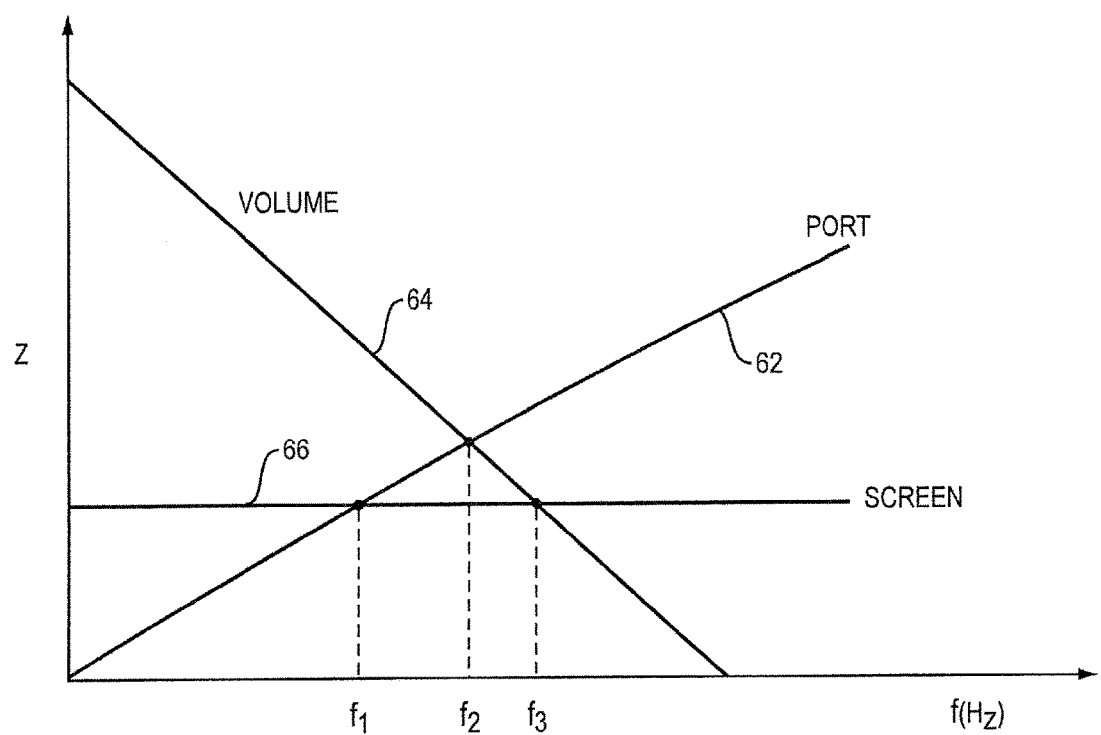
FIG. 3 is an exemplary plot illustrating aspects of a frequency-dependent dipole length for a dipole loudspeaker of the eyeglass headphones.

FIG. 3 is a plot of the magnitude of the impedance (Z) v. frequency (f) for the back side of a representative example of the loudspeaker of FIG. 1. A lower impedance equates to greater outputted volume velocity. At any particular frequency, the output from any or all of the back-side openings can contribute to the sound emitted from the loudspeaker. However, at most frequencies the impedance of one of the back-side openings will be lower than that of the others, and thus the sound pressure delivered from that opening, as well as the front-side opening, will dominate the loudspeaker output.

At relatively low frequencies, up to frequency f1, the loudspeaker back-side output is dominated by port opening 32, curve 62. Curve 62 can have a value that is proportional to L/A, where L is the length of port 34 and A is the area of port opening 32. Above frequency f1, the loudspeaker back-side output is dominated by screened opening 28, curve 66. The impedance (Z) of the screen is constant with frequency. At frequency f2, the port and volume resonate which cause the driver cone's motion to be lessened or stopped, especially when the damping due to the screen(s) is low. This results in more volume velocity from the back side than the front side (opening 20), and a non-ideal dipole. Above frequency f3, the loudspeaker back-side output is still dominated by the screen, however due to the low impedance of the back-side acoustic cavity (curve 64), much of the driver volume velocity is absorbed by the volume and less comes out the screen. In one exemplary non-limiting example, frequency f1 can be about 650 Hz, frequency f2 can be about 3,050 Hz and frequency f3 can be about 16,000 Hz.

Figure 4A:
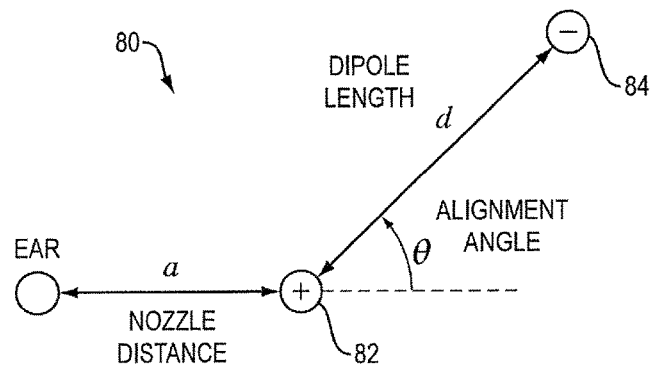
FIG. 4A is a representation of distances and angles for a dipole loudspeaker of the eyeglass headphones.

FIG. 4A is a representation 80 of distances and angles for a dipole loudspeaker of the eyeglass headphones. Nozzle 82 is the dipole opening closest to the ear, at a distance (nozzle distance "a") from the ear. The opposite phase opening 84 is located a distance (dipole length "d") from opening 82, and so "d" is the dipole length. As noted above, the dipole length can be frequency dependent. Theta is the angle ("alignment angle") between an axis connecting opening 82 and the ear, and an axis connecting dipole openings 82 and 84.

Figure 4B:
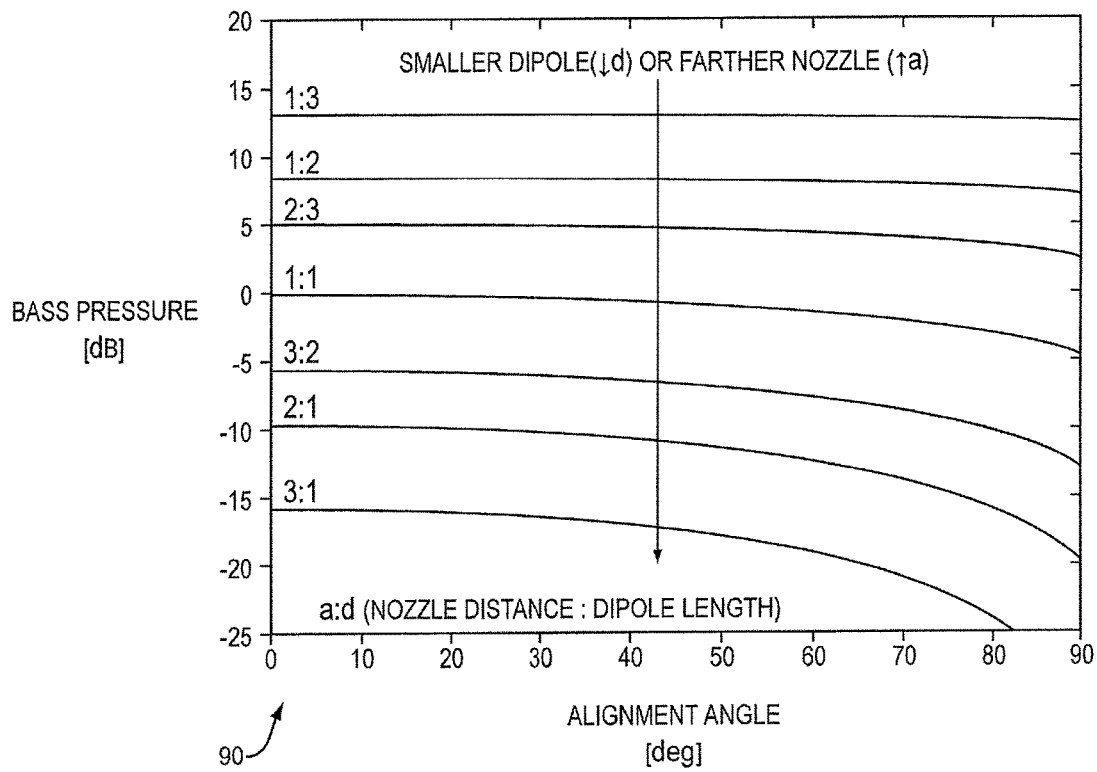
FIG. 4B is an exemplary plot illustrating an effect of the dipole length and a varied dipole alignment angle for the dipole loudspeaker represented by FIG. 4A.

FIG. 4B is an exemplary plot illustrating an effect of the dipole length and a varied dipole alignment angle (theta) for the dipole loudspeaker represented by FIG. 4A. A series of curves are plotted for different length ratios (a:d). The SPL at low frequency where dipole length "d" is much smaller than the acoustic wavelength is plotted vs. theta. For example, 3:1 indicates that the nozzle distance "a" is three times larger than the dipole length "d." These data establish that when the dipole is long and the nozzle is close to the ear (e.g., the 1:3 curve, which would be equivalent in one non-limiting example to a 30 mm dipole with the nozzle 10 mm from the ear), the alignment angle theta does not have a big effect on SPL at the ear. For example, a theta of 90 degrees leads to a loss of only about 1 dB. In contrast, when the dipole is smaller or the nozzle is farther from the ear (e.g., the 3:1 curve, which would be equivalent in one non-limiting example to a 15 mm dipole with the nozzle 45 mm from the ear), theta has a greater effect on SPL at the ear. For example, a theta of only 30 degrees leads to a similar loss of about 1 dB. These data indicate that small misalignments of the dipole axis with the nozzle axis do not have big effects on sound delivery to the ear. For the present variable length dipole transducer (such as shown in FIG. 1), the short dipole (the resistive opening 28) is more sensitive to alignment than the long dipole (mass port opening 32). For example, the shorter dipole (with the resistive opening) can be misaligned by at least about 40 degrees, while the longer dipole (with the mass port opening) can be misaligned by up to about 90 degrees. If the alignment of both dipoles is within about 20 degrees from the nozzle-ear axis, there is very little SPL loss. However, to obtain higher SPL at the ear, it is more important for the nozzle to be close to the ear than for the dipole to be aligned.

Figure 5:
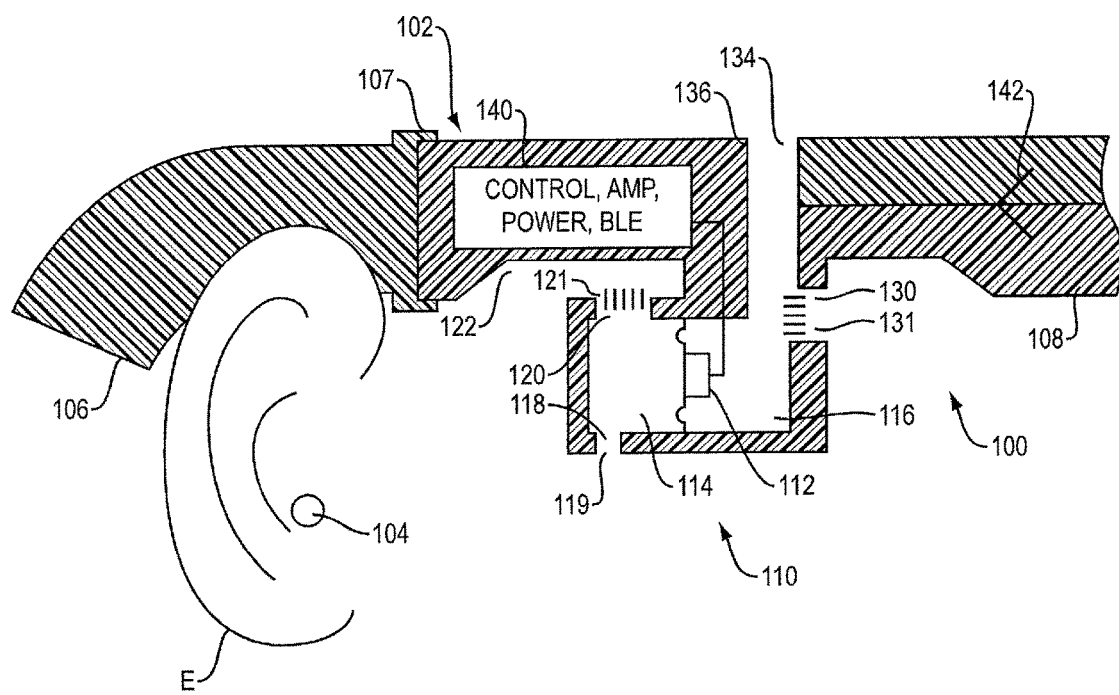
FIG. 5 is a schematic cross-sectional diagram of electronics, an antenna, and a dipole loudspeaker in one temple of eyeglass headphones.

FIG. 5 is a schematic cross-sectional diagram of system 100 comprising electronics, an antenna, and a dipole loudspeaker in one temple of eyeglass headphones. Note that FIG. 5 is schematic and is meant to represent certain features of the eyeglass headphones, without limiting the disclosure in any manner. Temple 102 includes posterior end 106 that sits on ear "E" which has ear canal opening 104. Anterior temple end 108 is coupled to a bridge (not shown). Dipole loudspeaker 110 is built into temple 102 in a manner such that nozzle 118 is close to ear canal opening 104. Note that in some but not all cases there would be a system 100 in each of the two temples of the eyeglasses, so that sound is delivered very close to both ears.

Loudspeaker 110 includes driver 112 that radiates into front volume 114 and back volume 116. Front volume 114 includes nozzle vent 118 that is aligned with opening 119 in temple 102, so that sound can escape via nozzle 118. Having the nozzle built into an eyeglass temple allows the nozzle to be located close to and in front of the ear, which allows sound to be best delivered to ear canal opening 104. Temple 102 can be (but need not be) made adjustable in length so that the user can place nozzle 118 in desired proximity to ear canal opening 104. This adjustable length feature is schematically depicted by joint 107 that allows ends 106 and 108 to move relative to one another, closer together or farther away. Front volume 114 also includes opposed resistive vent 120 that is aligned with opening 121 in temple 102, so that sound can escape via vent 120. Cavity 122 in temple 102 is acoustically coupled to opening 121. Cavity 122 should have enough volume to allow flow through opening 120, to damp the resonance in front volume 114. Back volume 116 includes resistive opening 130 that is aligned with opening 131 in temple 102, so that sound can escape via opening 130. Back volume 116 also includes mass port opening 134 at the end of elongated transmission line cavity or port 136 in temple 102.

Control, amplification, power, and wireless communications (e.g., Bluetooth low energy or BLE), and other necessary functions, are provided by electronics 140, which is built into or otherwise carried by temple 102. Electronics 140 supply audio signals to driver 112, and supply communication signals to built-in antenna 142. Antenna 142 can be located in the anterior portion of temple 102 (e.g., close to the bridge), so that its signal is minimally impacted by the wearer's head. In one example, wireless communications can be used to communicate audio signals from one side (one temple) to the other, in the instance where there are loudspeakers in both temples. Power for the loudspeakers can be provided locally (e.g., with a battery in the temple), or there can be a single battery and power can be transferred via wiring (not shown) that passes through the bridge or is otherwise transferred from one temple to the other.

Figure 6:
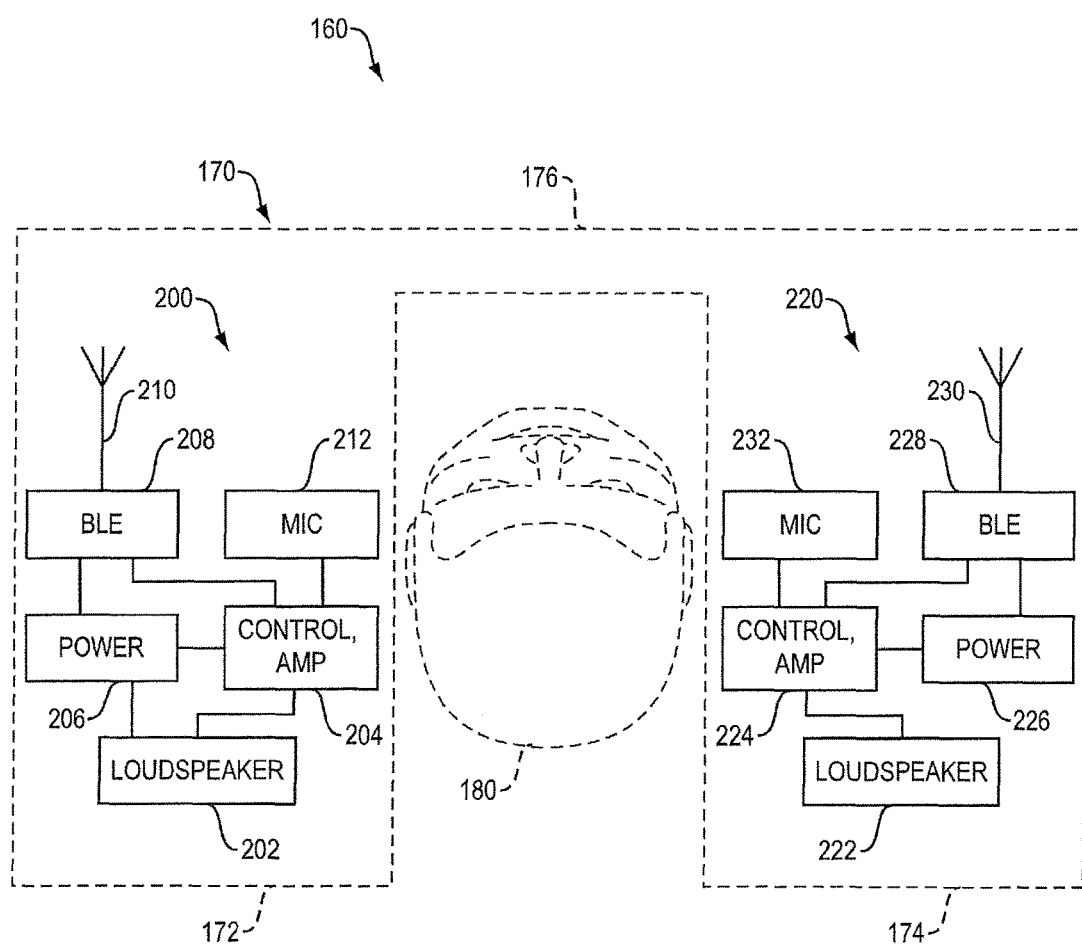
FIG. 6 is a functional block diagram of eyeglass headphones.

FIG. 6 is a functional block diagram of eyeglass headphones 160, with eyeglass frame 170 shown in a schematic manner as comprising left temple 172 and right temple 174 connected by bridge 176 that sits on the nose of head 180. Left system 200 and right system 220 are functionally identical in this non-limiting example. System 200 includes dipole loudspeaker 202 driven by control and amplification module 204. BLE unit 208 is electrically coupled to antenna 210, and is functionally coupled to module 204, so that system 200 can both send and receive signals to/from system 220. Optional microphone 212 can be used to pick up the wearer's voice. Microphone 212 can also be built into temple 172, or can be located in the bridge, for example at the bottom of the lens so that it is close to the mouth. The microphone can be arranged on the inside of the temple (i.e., facing the head). This may help shelter the microphone from wind and external noise, and thus may lead to improved signal to noise ratio as compared to locations elsewhere in the temple where the microphone is more exposed to wind and external noise. Power is provided to all powered components by power source (e.g., rechargeable battery) 206. Right temple system 220 includes dipole loudspeaker 222 driven by control and amplification module 224. BLE unit 228 is electrically coupled to antenna 230, and is functionally coupled to module 224, so that system 220 can both send and receive signals to/from system 200. Optional microphone 232 is also built into temple 174, and can be used to pick up the wearer's voice. The microphone can be arranged on the inside of the temple (i.e., facing the head). This helps shelter the microphone from wind and external noise, and thus is likely to have better voice pickup than the microphones in many headphones. Power is provided to all powered components by power source (e.g., rechargeable battery) 226.

Figure 7:
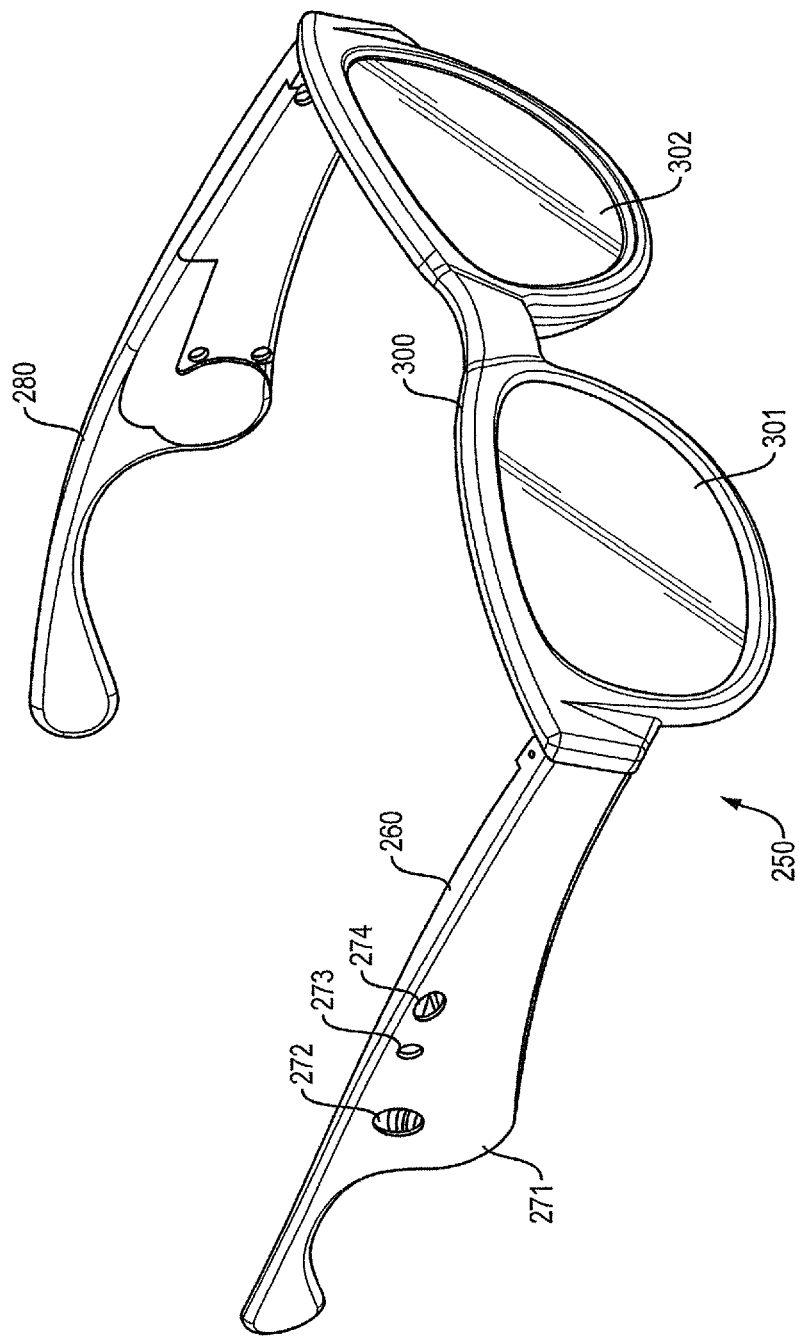
FIG. 7 is a front, perspective view of eyeglass headphones.

FIG. 7 is a front, perspective view of eyeglass headphones 250. In this non-limiting example there is an eyeglass bridge 300 that is constructed and arranged to sit on the nose, with lenses 301 and 302 in front of the eyes. Right temple 260 is coupled to bridge 300 and extends over the right ear. Left temple 280 is coupled to bridge 300 and extends over the left ear. Each temple comprises a dipole loudspeaker, as is further explained below. Visible in this view are rear high-frequency dipole opening 272 (which equates to opening 28, FIG. 1), rear low-frequency dipole opening 274 (which equates to opening 32, FIG. 1), and rear resonance damping opening 273 (which equates to opening 36, FIG. 1). Any or all of these three openings can be covered by a screen, as described above relative to FIG. 1. The screen covering opening 273 is preferably resistive, to accomplish waveguide resonance damping, as described above. Note that in this example the left temple 280 has a dipole transducer that is the same as that disclosed herein for the right temple.

Figure 8A:
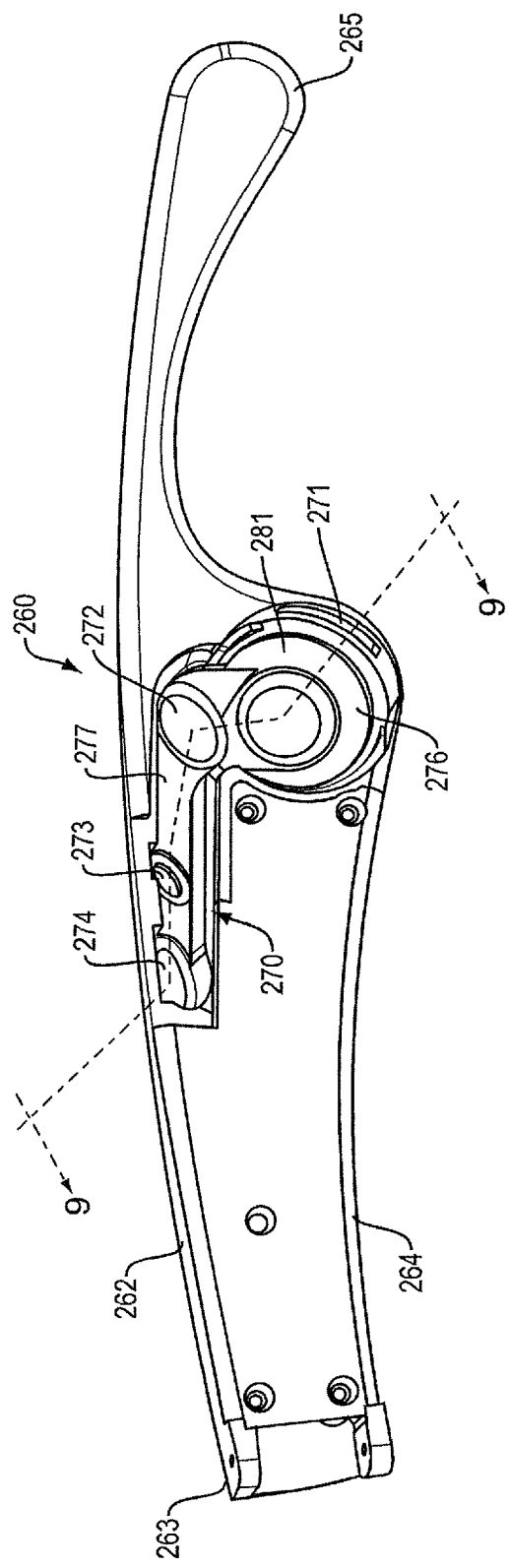
FIG. 8A is a partial side view of part of the right temple of the eyeglass headphones of FIG. 7.

FIG. 8A is a partial side view of part of the right temple 260 of the eyeglass headphones of FIG. 7. Anterior end 263 is constructed and arranged to be coupled to the bridge, in any manner known in the art. Posterior end 265 will sit on/behind the ear. Middle portion 262 between the two ends holds the dipole loudspeaker (which comprises cavity 270 and its openings, as further explained below), and also holds electronics (not shown) that are involved in (among other functions, as described elsewhere) wirelessly receiving audio signals, and any processing required to provide the audio signals to the driver located in cavity 270. These electronics may be (but need not be) located behind removable cover 264.

Cavity 270 comprises generally cylindrical cavity portion 281, which is arranged to hold a driver (not shown), and also define parts of the front driver volume or cavity 276. Cavity 281 also defines part of rear driver volume or cavity 277. Opening 272 communicates with rear cavity 277 and acts as one rear opening of the dipole. The second rear opening of the dipole is defined by opening 274, which also communicates with cavity 277. Opening 273, which also communicates with cavity 277, is involved in damping of standing waves in cavity 277. Slot or vent 271 communicates with front cavity 276 and acts as the nozzle (or, front side vent) that is arranged to deliver sound to the right ear of the user/wearer.

Figure 8B:
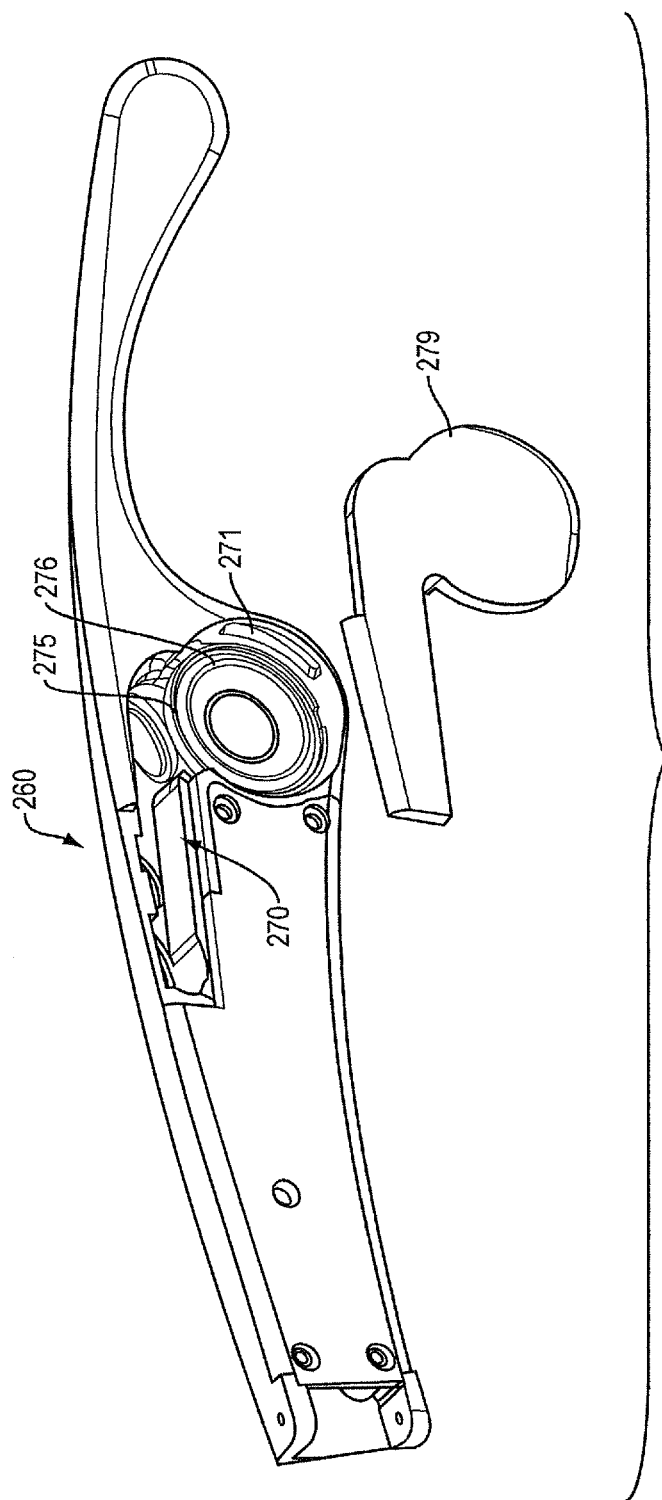
FIG. 8B is a view similar to that of FIG. 8A, but including the acoustic driver and showing a cover removed from the temple.

FIG. 8B is a view similar to that of FIG. 8A, but including the acoustic driver 275 located in cavity 281, and showing a cover 279 that is removably coupled to temple 260 so as to cover and close cavity 270 (except for the openings described above). One side (the front side in this non-limiting example) of driver 275 radiates into front cavity 276. Sound escapes from cavity 276 via front vent 271, which is typically located in front of and a short distance from the entrance to the ear canal.

Figure 9:
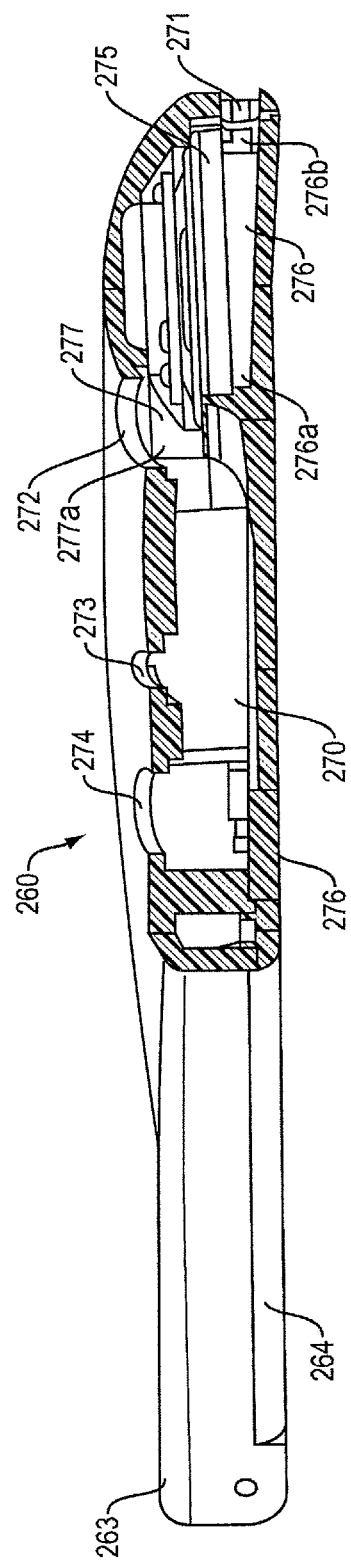
FIG. 9 is a cross-section taken along line 9-9, FIG. 8A, but including the driver shown in FIG. 8B.

FIG. 9 is a cross-section taken along line 9-9, FIG. 8A, but including the driver 275 shown in FIG. 8B. Front cavity 276 is in one non-limiting example preferably very small in volume, and therefore may have a diameter about the same size as the diameter of driver 275 and a very shallow depth, as shown. The front cavity can be but need not be generally cylindrical in shape. In one non-limiting example, front cavity 276 is generally trapezoidal in cross-section, as shown, such that the end 276a that is opposite the nozzle end 276b that is adjacent the nozzle 271 is narrower than the nozzle end, which should be wide enough to accommodate the nozzle opening.

Figure 10:
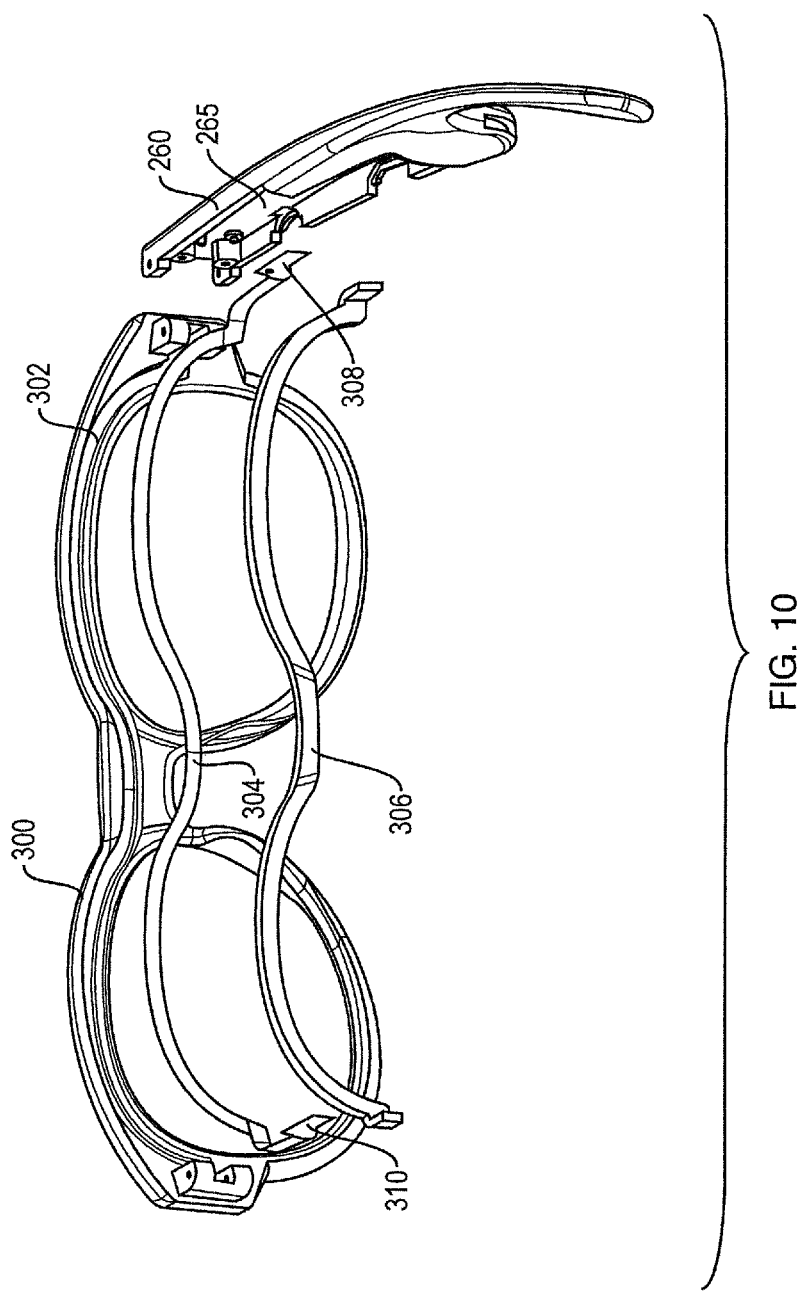
FIG. 10 is an exploded rear perspective view of the bridge and right temple of the eyeglass headphones of FIG. 7.

FIG. 10 is an exploded rear perspective view of the bridge and right temple of the eyeglass headphones of FIG. 7. Bridge 300 has slot 302 that extends across the full width of the bridge (in this non-limiting example, in the portion above the lenses), and accommodates flex circuit 304 that is located in the slot. Cover 306 can protect and conceal the flex circuit. Flex circuit 304 has ends 310 and 308 that are electrically coupled to small circuit boards that are located in the temples. There would be one board (not shown) in cavity 265 of right temple 260. Cover 264 (FIGS. 8A and 9) conceals and protects the board. The board could carry electronics and a battery power source for operation of the headphones. Also, a wireless antenna could be located on the board or elsewhere in cavity 265. The antenna can be used for Bluetooth reception of audio signals from a Bluetooth source. Any other wireless communication standards could be used. Also, if a second antenna is placed similarly at the anterior end of the left temple, the two antennas can communicate over a line-of-sight path, with little interference from the user's head. This would provide an advantage over location of antennas farther back in the temples, where the head would interfere with line-of-sight signal transmission. Also, antennas could be used to transmit audio signals from one side to the other (e.g., using Bluetooth Low Energy (BLE)), in which case the headphones could include only one audio source receiver. This would simplify the circuitry and lower its cost. In any case, it is contemplated that a battery power source for the headphones would likely be located in only one temple, and power (and control signals) can be routed from one temple to the other over flex circuit 304.

A number of implementations have been described. Nevertheless, it will be understood that additional modifications may be made without departing from the scope of the inventive concepts described herein, and, accordingly, other embodiments are within the scope of the following claims.

What is claimed is:

1. An eyeglass headphone, comprising:
a frame that is constructed and arranged to be carried by the head of a wearer, the frame comprising a bridge that is adapted to be supported by the wearer's nose, and a left temple and a right temple that extend rearwardly from the bridge, toward the left and right ears of the wearer, respectively; and
a dipole loudspeaker built into the frame, where the dipole loudspeaker comprises a driver that emits front-side acoustic radiation from its front side, and emits rear-side acoustic radiation from its rear side;
wherein the frame comprises a first acoustic cavity that receives the front-side acoustic radiation, and at least first, second and third sound-emitting openings, wherein the first sound-emitting opening is acoustically coupled to the first acoustic cavity and is constructed and arranged to emit from the frame acoustic radiation from the first acoustic cavity, the second sound-emitting opening is constructed and arranged to emit rear-side acoustic radiation from the frame, and the third sound-emitting opening is constructed and arranged to emit from the frame acoustic radiation from the first acoustic cavity.

2. The eyeglass headphone of claim 1, wherein the frame further comprises a fourth sound-emitting opening that is constructed and arranged to emit rear-side acoustic radiation from the frame.

3. The eyeglass headphone of claim 2, wherein a distance between openings defines an effective length of the dipole loudspeaker, and wherein the effective length is frequency dependent.

4. The eyeglass headphone of claim 3, wherein the loudspeaker comprises a port that leads to the fourth sound-emitting opening, and an acoustic impedance of the port rises with frequency, so that the effective dipole length is larger at lower frequencies than it is at higher frequencies.

5. The eyeglass headphone of claim 1, wherein the third sound-emitting opening and the first sound-emitting opening each have an acoustic impedance, and wherein the two acoustic impedances are different from each other.

6. The eyeglass headphone of claim 1, wherein the frame further comprises a second acoustic cavity that receives the rear-side acoustic radiation.

7. The eyeglass headphone of claim 6, wherein the second sound-emitting opening is acoustically coupled to the second acoustic cavity, to emit from the frame radiation from the second acoustic cavity.

8. The eyeglass headphone of claim 1, further comprising electronic circuitry coupled to the frame and that is arranged to wirelessly transmit or receive audio signals that are played by the dipole loudspeaker.

9. The eyeglass headphone of claim 8, wherein the electronic circuitry comprises an antenna built into a temple.

10. The eyeglass headphone of claim 9, wherein the electronic circuitry comprises separate electronics in each of the left and right temples, and first and second separate antennas, with the first antenna built into the left temple and electrically coupled to the electronics in the left temple and the second antenna built into the right temple and electrically coupled to the electronics in the right temple.

11. The eyeglass headphone of claim 10, wherein the antennas are in the temples proximate the bridge.

12. The eyeglass headphone of claim 1, further comprising a microphone carried by a temple and arranged to directly face the side of the head adjacent the temple.

13. The eyeglass headphone of claim 1, wherein one of the first and second sound-emitting openings is located in front of an ear of the wearer.

14. The eyeglass headphone of claim 13, wherein the other of the first and second sound-emitting openings is also located in front of the ear of the wearer, and is farther from the ear canal opening than is the one of the first and second sound-emitting openings.

15. The eyeglass headphone of claim 14, wherein the one of the first and second sound-emitting openings is located a first distance from and along a first axis from the opening of the ear canal, and wherein the first and second sound-emitting openings are located a second distance from one another along a second axis that intersects the first axis.

16. The eyeglass headphone of claim 15, wherein the first and second axes are not coincidental, and an angle between the first axis and the second axis is no more than about 90 degrees.

17. The eyeglass headphone of claim 15 wherein the first distance is no more than about 35 mm.

18. An eyeglass headphone, comprising:
a frame that is constructed and arranged to be carried by the head of a wearer, the frame comprising a bridge that is adapted to be supported by the wearer's nose, and a left temple and a right temple that extend rearwardly from the bridge, toward the left and right ears of the wearer, respectively; and
a dipole loudspeaker built into each temple of the frame, where the dipole loudspeakers each comprise a driver that emits front-side acoustic radiation from its front side, and emits rear-side acoustic radiation from its rear side;
wherein each temple comprises at least first, second, and third sound-emitting openings, wherein the first sound-emitting opening is located in front of an ear of the wearer and is constructed and arranged to emit front-side acoustic radiation from the temple, and wherein the second sound-emitting opening is also located in front of the ear of the wearer and is farther from the ear canal opening than is the first sound-emitting opening, and wherein the second and third sound-emitting openings are constructed and arranged to emit rear-side acoustic radiation from the temple, wherein a distance between openings defines an effective length of the dipole loudspeaker, and wherein the effective length is frequency dependent where the effective dipole length is larger at lower frequencies than it is at higher frequencies.

* * * * *